United States Patent
Amin-Sanayei et al.

(10) Patent No.: US 9,239,051 B1
(45) Date of Patent: Jan. 19, 2016

(54) WATERBORNE FLUOROPOLYMER COMPOSITION

(71) Applicant: Arkema Inc., King of Prussia, PA (US)

(72) Inventors: Ramin Amin-Sanayei, Malvern, PA (US); Scott R. Gaboury, Blue Bell, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/929,710

(22) Filed: Nov. 2, 2015

Related U.S. Application Data

(60) Division of application No. 13/192,968, filed on Jul. 28, 2011, now abandoned, which is a continuation-in-part of application No. 12/788,427, filed on May 27, 2010, now Pat. No. 9,202,638.

(60) Provisional application No. 61/182,364, filed on May 29, 2009.

(51) Int. Cl.
- *H01M 4/02* (2006.01)
- *F04C 15/00* (2006.01)
- *H01M 4/62* (2006.01)

(52) U.S. Cl.
CPC ........... *F04C 15/0096* (2013.01); *H01M 4/623* (2013.01)

(58) Field of Classification Search
None
See application file for complete search history.

(56) References Cited

U.S. PATENT DOCUMENTS

| | | | |
|---|---|---|---|
| 4,039,497 A | 8/1977 | Troussier et al. | |
| 5,776,637 A | 7/1998 | Kashio et al. | |
| 6,096,101 A | 8/2000 | Liu et al. | |
| 6,156,453 A | 12/2000 | Shimizu et al. | |
| 6,200,703 B1 | 3/2001 | Kashio et al. | |
| 6,498,207 B1 | 12/2002 | Hoshikawa et al. | |
| 7,220,483 B2 | 5/2007 | Coates et al. | |
| 7,282,528 B2 | 10/2007 | Asano et al. | |
| 7,659,335 B2 | 2/2010 | Konabe | |
| 8,366,231 B2 | 2/2013 | Karin et al. | |
| 2002/0168569 A1* | 11/2002 | Barriere | H01M 2/164 429/217 |
| 2005/0129838 A1 | 6/2005 | Naarmann et al. | |
| 2005/0233911 A1 | 10/2005 | Samuel | |
| 2006/0078800 A1 | 4/2006 | Konabe | |
| 2006/0234128 A1 | 10/2006 | Tu | |
| 2007/0135546 A1 | 6/2007 | Amin-Sanayei et al. | |
| 2007/0282044 A1 | 12/2007 | Cavanaugh et al. | |
| 2008/0038447 A1 | 2/2008 | Tu | |
| 2008/0187838 A1 | 8/2008 | Le | |
| 2008/0264864 A1 | 10/2008 | Dadalas et al. | |
| 2010/0304270 A1 | 12/2010 | Amin-Sanayei et al. | |
| 2011/0111295 A1 | 5/2011 | Yamada | |

FOREIGN PATENT DOCUMENTS

| | | |
|---|---|---|
| JP | 6280079 | 10/1994 |
| JP | 11003709 | 1/1999 |
| JP | 11250937 | 9/1999 |
| JP | 11273726 | 10/1999 |
| JP | 2000323363 | 11/2000 |
| JP | 2000357505 | 12/2000 |
| JP | 2004235068 | 8/2004 |
| JP | 2007122907 | 5/2007 |
| JP | 2009158335 | 7/2009 |
| WO | WO2010/106292 | 9/2010 |

\* cited by examiner

*Primary Examiner* — Patrick Ryan
*Assistant Examiner* — Wyatt McConnell
(74) *Attorney, Agent, or Firm* — Thomas F. Roland

(57) ABSTRACT

This invention relates to a waterborne fluoropolymer composition useful for the fabrication of Li-Ion-Battery (LIB) electrodes. The fluoropolymer composition contains an organic carbonate compound, which is more environmentally friendly than other fugitive adhesion promoters currently used in waterborne fluoropolymer binders. An especially useful organic carbonate compound is ethylene carbonate (EC) and vinylene carbonate (VC), which are solids at room temperature, and other carbonates which are liquid at room temperature such as propylene carbonate, methyl carbonate and ethyl carbonate. The composition of the invention is low cost, environmentally friendly, safer, and has enhanced performance compared to current compositions.

11 Claims, No Drawings

WATERBORNE FLUOROPOLYMER COMPOSITION

This application is a divisional application of copending U.S. application Ser. No. 13/192,968, filed Jul. 28, 2011, which is a continuation-in-part of copending U.S. application Ser. No. 12/788,427, filed May 27, 2010, both of which this application claims priority from. This application also claims benefit, under U.S.C. §119(e) of U.S. Provisional Application No. 61/182,364, filed May 29, 2009. The cited references are incorporated herein by reference.

FIELD OF THE INVENTION

This invention relates to a waterborne fluoropolymer composition useful for the fabrication of Li-Ion-Battery (LIB) electrodes. The fluoropolymer composition contains an organic carbonate compound, which is more environmentally friendly than other fugitive adhesion promoters currently used in waterborne fluoropolymer binders. An especially useful organic carbonate compound is ethylene carbonate (EC) and vinylene carbonate (VC), which are solids at room temperature, and other carbonates which are liquid at room temperature such as propylene carbonate, methyl carbonate and ethyl carbonate. The composition of the invention is low cost, environmentally friendly, safer, and has enhanced performance compared to current compositions.

BACKGROUND OF THE INVENTION

Fluoropolymers are a unique family of materials that are most often used where exceptionally high performance, maintenance-free, and long-lasting service-life is required. Among fluoropolymers, polyvinylidene fluoride (PVDF) has a great balance of properties and a long legacy as the only commercially accepted binder for LIB cathodes and as a separator in polymer battery. This usefulness comes from alternating $CH_2$ and $CF_2$ groups in PVDF backbone that produce a high dipole moment, resulting in good adhesion and compatibility with a vast array of materials.

U.S. Pat. No. 5,776,637 and U.S. Pat. No. 6,200,703 describe a PVDF binder solution in organic solvents, particularly in NMP, mixed with a powdery electrode material to form an electrode to be used in a non-aqueous-type battery. The role of the organic solvent is primarily to dissolve PVDF to provide good adhesion (non-reversible adhesion) and interconnectivity between the powdery electrode material particles upon evaporation of the organic solvent. The bonded powdery electrode materials together should be able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode to current collector, and lithium ions must move within powdery particles of active materials as well as between anode and cathode. In order to achieve desired performance, PVDF binder is dissolved in a large volume of organic solvents, such as NMP with 20 to 1 ratio, and subsequently is admixed with powdery electrode forming material to produce slurry which upon casting and drying will form electrode.

An organic-solvent-based slurry presents safety, health and environmental dangers. Organic solvents are generally toxic and flammable, volatile in nature, and involve special manufacturing controls to mitigate and reduce environmental pollution and safety risks. Moreover, the large carbon footprint associated with use of organic solvents, is not environmentally desirable. Furthermore, extra manufacturing steps are associated with capturing and recycling large amount of NMP used in the preparation of slurry and fabrication of electrodes. A suitable waterborne fluoropolymer (particularly one that is PVDF-based), along with proper formulation could eliminate the need for large volume of organic solvents in the fabrication of electrodes for secondary Li-ion-batteries and overcome environmental hazards associated with use of such solvents.

There is an environmentally-driven, and safety-driven desire to be able to produce excellent, interconnected PVDF-based electrodes, without the massive use of organic solvents.

To effectively employ waterborne slurries in electrode-forming processes, it is important to develop binder systems that are compatible with current manufacturing practices and provide desired properties of the intermediate and final products. Some common criteria include: a) stability of the waterborne fluoropolymer dispersion, having sufficient shelf-life, b) stability of the slurry after admixing the powdery material, c) appropriate viscosity of the slurry to facilitate good aqueous casting, and d) sufficient interconnectivity within the electrode which is non-reversible after drying. Additionally, from a regulatory view, fluoropolymers made without fluorosurfactants are preferred.

U.S. Pat. No. 7,282,528 entitled "electrode additive" describes fluoropolymer dispersions for cathode electrodes, which are made by using per-fluorinated surfactants. The patent fails to teach or suggest the use of any fugitive adhesion promoters, and specifically the use of organic carbonates in the latex to provide and facilitate interconnectivity in the electrode that is non-reversible. Polytetrafluoroethylene (PTFE) binders, or blends of other fluoropolymers with 50% or more PTFE are preferred and exemplified. The negative electrode of the examples uses a conventional solvent-based PVDF solution.

U.S. Pat. No. 7,659,335 describes similar fluoropolymer dispersions used as electrode binders, having a specific class of non-ionic stabilizer used in post-polymerization. PTFE is either preferred since melt-processing or dissolution is substantially impossible. There is no mention of fugitive adhesion promoters or adding organic carbonates to the latex to provide interconnectivity within the electrode. There are large differences in the properties and processing of the final electrodes formed from PTFE and PVDF binders. PTFE polymers have very high melting points and exhibit very strong resistance to dissolution in common solvents. As a result, PTFE particles are not able to soften, flow, and adhere to powdery particles to provide interconnectivity within an electrode. Additionally, PTFE and its blends with other fluoropolymers do not meet some of the criteria needed as a viable binder, including the stability needed for waterborne fluoropolymer dispersion. Moreover, PTFE binders do not provide sufficient interconnectivity in electrodes which is non-reversible. Waterborne PVDF-based binders with organic carbonates of the present invention exhibit sufficient shelf stability, do not need concentrating steps, and provide interconnectivity when properly formulated.

A waterborne binder is described in US20100304270 for making an electrode using water as the media to prepare slurry instead of using conventional NMP solution. The disclosed slurry formulation requires anti-foaming agent, thickener, adhesion promoter, and a relatively high binder loading. In general, any additive used in the slurry formulation could have negative impact on the long-term performance of a lithium ion battery, because the additives could be oxidized in the cathode and generate off-gases. There is an interest in reducing the amount of non-active ingredients in a lithium ion battery in order to increase the energy density, so it is desirable to reduce the non-active materials in the slurry.

Surprisingly, it has been found that a mixture of a waterborne fluoropolymer with an organic carbonate as a fugitive adhesion promoter can provide an effective, economically friendly waterborne binder for a lithium ion battery. An especially useful organic carbonate is ethylene carbonate (EC) which is solid at room temperature, as the additive to binder media eliminates the need for organic solvent, wetting agent, or anti-foaming agent for slurry preparation. The waterborne fluoropolymer composition provides interconnectivity between active ingredients and sufficient adhesion to current collectors upon drying. Even though EC is solid at room temperature, it has been surprisingly found that the addition of EC to the waterborne fluoropolymer provides good interconnectivity and adhesion for powdery materials without a need for other additives.

SUMMARY OF THE INVENTION

The invention relates to a composition comprising:
  a) waterborne fluoropolymer having a solids of 0.5 to 150 parts fluoropolymer particles having a weight average particle size of less than 500 nm;
  b) from 10 to 500 parts of one or more powdery electrode-forming materials;
  c) from 1 to 150 parts of an organic carbonate;
  d) 100 parts water;
All parts being parts by weight based on 100 parts by weight of water. Preferably the waterborne fluoropolymer is a polyvinylidene fluoride-based polymer.

The invention further relates to a binder for an electrode comprising an electroconductive substrate coated with slurry made with the waterborne fluoropolymer of the invention, and a method for producing the electrode from the composition(s) of the invention.

The invention further relates to a non-aqueous-type Li-ion-Battery having at least one electrode made with binder of the invention.

DETAILED DESCRIPTION OF THE INVENTION

All references listed in this application are incorporated herein by reference. All percentages in a composition are weight percent, unless otherwise indicated, and all molecular weights are given as weight average molecular weight, unless stated otherwise.

By "irreversible" as used herein in relation to an electrode formed from the polymer binder of the aqueous composition, is meant that following the drying of the aqueous composition in which the polymer binder binds the powdery electrode-forming materials to each together and to the electroconductive substrate, the polymer binder is not soluble or redispersible in water. The irreversibility is due to the fact that the polymer particles flow and adhere to the powdery electrode-forming materials, providing interconnectivity within the electrode. This is opposed to an electrode formed from a PTFE dispersion or excessive water soluble thickener (such as carboxylated methyl cellulose) which form a binder without interconnectivity, and thus when the coating is placed in water it redisperses.

By "interconnectivity" is meant that the powdery electrode-forming materials are permanently bonded together by the polymeric binder, providing low electrical resistance and high ion mobility within the electrode.

The manner of practicing the invention will now be generally described with respect to a specific embodiment thereof, namely polyvinylidene fluoride-based polymer prepared by aqueous emulsion polymerization using non-fluorinated emulsifier as the principle emulsifier and used in preparation of an electrode. Although the process of the invention has been generally illustrated with respect to PVDF based polymers, one of skill in the art will recognize that analogous polymerization techniques can be applied to the preparation of homopolymers and copolymers of fluorinated monomers and their formulation for the preparation of electrodes in general, and more specifically to homopolymers or copolymers of vinylidene fluoride (VDF), tetrafluoroethylene (TFE), and/or chlorotrifluoroethylene (CTFE)—with co-reactive monomers fluorinated or non-fluorinated such as hexafluoropropylene, perfluorovinyl ether, and the like. While non-fluorinated surfactants are preferred, the use of fluorosurfactants is also anticipated by this invention.

PVDF

The term "vinylidene fluoride polymer" (PVDF) used herein includes both normally high molecular weight homopolymers, copolymers, and terpolymers within its meaning. Such copolymers include those containing at least 50 mole percent, preferably at least 75 mole %, more preferably at least 80 mole %, and even more preferably at least 85 mole % of vinylidene fluoride copolymerized with one or more comonomers selected from the group consisting of tetrafluoroethylene, trifluoroethylene, chlorotrifluoroethylene, hexafluoropropene, vinyl fluoride, pentafluoropropene, tetrafluoropropene, trifluoropropene, perfluoromethyl vinyl ether, perfluoropropyl vinyl ether and any other monomer that would readily copolymerize with vinylidene fluoride.

In one embodiment, up to 30%, preferably up to 25%, and more preferably up to 15% by weight of hexafluoropropene (HFP) units and 70%, preferably 75%, more preferably 85% by weight or more of VDF units are present in the vinylidene fluoride polymer. It is desired that the HFP units be distributed as homogeneously as possible to provide PVDF-HFP copolymer with excellent dimensional stability in an end-use environment—such as in a battery.

The PVDF for use in the electrode composition preferably has a high molecular weight. By high molecular weight, as used herein is meant PVDF having a melt viscosity of greater than 1.0 kilopoise according to ASTM method D-3835 measured at 450° F. and 100 sec$^{-1}$.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant free, with no fluorosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a weight average particle size of less than 500 nm, preferably less than 400 nm, and more preferably less than 300 nm. The weight average particle size is generally at least 20 nm and preferably at least 50 nm. Additional adhesion promoters may also be added to improve the binding characteristics and provide connectivity that is non-reversible. A minor amount of one or more other water-miscible solvents, such as ethylene glycol, may be mixed into the PVDF latex to improve freeze-thaw stability.

In the present invention, PVDF polymer binder is generally used in the aqueous electrode-forming composition, however a blend of several different polymer binders, preferably all fluoropolymer binders, and most preferably all PVDF binders may also be used. In one embodiment, only thermoplastic fluoropolymers that can be softened by fugitive adhesion promoters, specifically organic carbonates, and more specifically EC, are used as the polymeric binder. The fluoropolymer of the invention is present in the waterborne fluoropolymer composition at from 0.5 to 150 parts, preferably 1 to 100 parts, and more preferably 5 to 75 parts of fluoropolymer to 100 parts of water, Organic Carbonates The waterborne slurry of the invention contains at least one organic carbonate, in addition to the fluoropolymer and water. The organic carbonate acts as a fugitive adhesion promoter to produce the interconnectivity needed in electrodes formed from the composition of the invention. By "fugitive adhesion promoter" as used herein is meant an agent that increases the interconnectivity of the composition after coating on a substrate. The fugitive adhesion promoter is then capable of being removed from the formed electrode generally by evaporation (for a chemical) or by dissipation (for added energy).

Organic carbonates of the invention include, but are not limited to:

a) carbonates having the general formula: $(R_2)CO_3(R_1)$ where $R_1$ and $R_2$ represent a linear or branched $C_{1-4}$ alkyl group; $R_1$ and $R_2$ can be the same of different. Examples include, for example, methyl carbonate, ethyl carbonate, n-propyl carbonate, sec-propyl carbonate, n-butyl carbonate, t-butyl carbonate, methyl-ethyl carbonate, methyl-propyl carbonate, ethyl-propyl carbonate, methyl-butyl carbonate, and ethyl-butyl carbonate.

b) ethylene carbonate CAS#96-49-1 having a melting point of 35-38° C.;

c) propylene carbonate CAS#108-32-7 having boiling point of 240° C.;

d) butylene carbonate isomers; and e) vinylene carbonate.

Especially preferred organic carbonates are ethylene carbonate, propylene carbonate, and vinylene carbonate. Ethylene carbonate is of special interest, since it is a solid at room temperature, yet easily dissolves in water at any portion.

The composition of the invention contains 1 to 150 parts, preferably from 2 to 100 parts and more preferably from 10 to 50 parts by weight, of one or more organic carbonates per 100 parts by weight of water. The useful organic carbonates that are liquids are soluble or miscible in water. This organic carbonate acts as a plasticizer for PVDF particles, making them tacky and capable of acting as discrete adhesion points during the drying step. The PVDF polymer particles are able to soften, flow and adhere to powdery materials during manufacture, resulting in electrodes with high connectivity that are non-reversible. In one embodiment the organic carbonate is a latent solvent, which is a solvent that does not dissolve or substantially swell PVDF resin at room temperature, but will solvate the PVDF resin at elevated temperatures.

Powdery Electrode-Forming Material

The composition of the invention contains 10 to 500 parts, preferably 20 to 400 parts, more preferably 25 to 300 parts of one or more powdery electrode-forming materials per 100 parts of water. The nature of the powdery electrode-forming material depends on whether the composition will be used to form a positive or a negative electrode. In the case of a positive electrode, the active electrode material may be an oxide, sulfide or hydroxide of lithium and/or a transition metal (including but not limited to cobalt, manganese, aluminum, titanium, or nickel, and iron phosphates, manganese phosphate). Double, and triple salts of lithium are also contemplated. Preferred positive electrode materials include, but are not limited to, $LiCoO_2$, $LiNi_xCo_{1-x}O_2$, $LiMn_2O_2$, $LiNiO_2$, LiFePO4, $LiNi_xCo_yMn_zO_m$, $LiNi_xMn_yAl_zO_m$ where x+y+z=1 and m is an integer representing the number of oxygen atom in the oxide to provide an electron-balanced molecule; as well as lithium-metal oxides such as lithium cobalt oxide, lithium iron phosphate, lithium manganese phosphate, lithium-nickel oxide, and lithium-manganese oxide.

In the case of a negative electrode, the active material is generally a carbonaceous material, nano-titanate, or other matrix capable of being doped with lithium ions. Useful carbonaceous materials include, but are not limited to graphite, manmade graphite, carbon, carbon black, acetylene black, phenolic resin, pitch, tar, etc. In the present invention carbon fibers can also be used.

The ratio of PVDF solids to powdery electrode-forming material is from 0.5-25, parts by weight of PVDF solids to 75 to 99.5 parts by weight powdery electrode material, preferably from 0.5-15, parts by weight of PVDF solids to 85 to 99.5 parts by weight powdery electrode material, more preferably from 1-10 parts by weight of PVDF solids to 90 to 99 parts by weight powdery electrode material, and in one embodiment from 0.5-8, parts by weight of PVDF solids to 92 to 99.5 parts by weight powdery electrode material. If less PVDF is used, complete interconnectivity may not be achieved, and if more PVDF is used, there is a reduction in conductivity, and also the composition takes up volume and adds weight—and one use of the composition is for very small and light batteries.

Other Additives

The composition of the invention optionally contains other additives in effective amounts, such as surfactants or anti-settling agents, wetting agents, thickeners and rheology modifiers, fillers, leveling agents, anti-foaming agents, pH buffers, and other adjuvants typically used in waterborne formulation while meeting desired electrode requirements.

The composition of the invention contains 0 to 10 parts, preferably from 0.1 to 10 parts, and more preferably 0.5 to 5 parts of one or more anti-settling agents and/or surfactants per 100 parts of water. These anti-settling agents or surfactants are added to the PVDF dispersion post-polymerization, generally to improve the shelf stability, and provide additional stabilization during slurry preparation. Useful anti-settling agents include, but are not limited to, ionic substances, such as salts of alkyl sulfates, sulfonates, phosphates, phosphonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants or in combination with non-ionic surfactants are used. It is preferred that no fluorinated surfactants are present in the composition, either residual surfactant from the polymerization process, or added post-polymerization in forming or concentrating an aqueous dispersion.

The composition of the invention optionally contains 0 to 5 parts, preferably from 0 to 3 parts of one or more wetting agents per 100 parts of water. Surfactants can serve as wetting agents, but wetting agents may also include non-surfactants. In some embodiments, the wetting agent can be an organic solvent. It has been found that the presence of optional wetting agents permits uniform dispersion of powdery electrode material(s) into aqueous dispersion of vinylidene fluoride polymer. Some electrode materials, such as carbonaceous materials will not disperse in an aqueous dispersion without the use of wetting agent. Useful wetting agents include, but are not limited to, ionic and non-ionic surfactants such as the TRITON series (from Dow) and the PLURONIC series (from BASF), and organic liquids that are compatible with the aqueous dispersion, including but not limited to NMP, DMSO, and acetone.

The composition of the invention may contain 0 to 10 parts, preferably from 0 to 5 parts of one or more thickeners or rheology modifiers per 100 parts of water. Addition of water-soluble thickener or rheology modifier to the above dispersion prevents or slows down the settling of powdery electrode materials while providing appropriate slurry viscosity for a casting process. Useful thickeners include, but are not limited to the ACRYSOL series (from Dow Chemical); partially neutralized poly (acrylic acid) or poly (methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

The thickeners of the invention are used in the aqueous composition containing the PVDF and powdery electrode material, and are not used in pure form as a second coating composition as has been described in the JP 2000357505 reference.

Aqueous Dispersion Formulation

The aqueous electrode-forming composition of the invention can be obtained in many different ways.

In one embodiment, a PVDF dispersion is formed (preferably without any fluorosurfactant) and a predetermined amount of any anti-settling agent(s) or surfactant(s), is diluted in water and post-added to the PVDF dispersion latex with stirring, in order to provide adequate storage stability for the latex. To this PVDF one or more optional additives are added, with stirring. The pH can be adjusted, if needed, for the thickener to be effective. The electrode-forming powdery material(s) and other ingredients are then added to the mixture. It may be advantageous to disperse the electrode-forming powdery material(s) in the organic carbonate, the latent solvent or wetting agent to provide wetting of the powdery materials prior to admixing with the aqueous PVDF binder formulation. The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, and 250° C. depending on application methods.

The aqueous dispersion composition is very critical to manufacturing a high quality and low cost electrode. A good and well-balanced slurry formulation will help to achieve good dispersion, which will not only lead to a uniform and high quality electrode but also decrease the manufacturing cost by reducing the scrap rate. Furthermore, addition of suitable dispersion agents will decrease the mixing time, which in turn will increase productivity. Secondly, the slurry formulation will affect the slurry stability, the slurry settle-down time, and viscosity. The unstable slurry will not only increase the production cost due to a high scrap rate but also will lead to low quality product due high variation in electrode thickness.

The aqueous formulation could affect the electrode performance, for example additives such as anti-foaming agents, coalescent agents, wetting agents, in slurry formulation have tendency to be oxidized during charging cycle and generate off-gas with is extremely undesired for LIB. Surprisingly, when the aqueous fluoropolymer binder is used in conjunction with ethylene carbonate, propylene carbonate and vinylene carbonate, the need for all of these additives can be eliminated.

The aqueous electrode composition is applied onto at least one surface, and preferably both face surfaces, of an electroconductive substrate by means known in the art, such as by brush, roller, ink jet, squeegee, foam applicator, curtain coating, vacuum coating, or spraying. The electroconductive substrate is generally thin, and usually consists of a foil, mesh or net of a metal, such as aluminum, copper, lithium, iron, stainless steel, nickel, titanium, or silver. The coated electroconductive substrate is then dried to form a coherent composite electrode layer, that may then be calendered, providing an interconnected composite electrode usable in a non-aqueous-type battery. The aqueous electrode composition can be optionally baked at elevated temperature to achieve high adhesion strength. The dried electrode can be optionally subjected to calendering at high pressure and high temperature to further improve electrode adhesion.

The aqueous electrode composition of the present invention has an advantage in processing, in that water has a boiling point lower than the commonly used solvents for PVDF, and thus can be dried faster, or at a lower temperature than solvent-based PVDF compositions, and lower than compositions containing PTFE. Process temperatures of 150° C. or less, 120° C. or less, 100° C. or less and even 90° C. or less may be used and result in a useful electrode.

Another advantage of using the aqueous coating of the present invention over solvent coatings, is that an aqueous PVDF dispersion serves as a binder with polymer particles binding together the powdery electrode materials only at specific discrete points to produce interconnectivity, while a solution coating forms a continuous coating on the powdery electrode materials. The continuous polymer coating formed from solution coatings, while very thin, still serves as an insulator, reducing the electrical conductivity.

The electrodes of the invention can be used to form an electrochemical device, such as a battery, capacitor, electric double layer capacitor, membrane electrode assembly (MEA) or fuel cell, by means known in the art. A non-aqueous-type battery can be formed by placing a negative electrode and positive electrode on either side of a separator. The separator is generally a polymeric porous film impregnated with an electrolytic solution.

EXAMPLES

Synthesis of Waterborne Fluoropolymer

Into an 80-gallon stainless steel reactor was charged, 345 lbs of deionized water and 250 grams of Pluronic 31R1 non-ionic surfactant (from BASF). Following evacuation, agitation was begun at 23 rpm and the reactor was heated to 100° C. After reactor temperature reached the desired set point, 0.6 lbs propane was charged into the reactor. Reactor pressure was then raised to 650 psi by charging about 35 lbs vinylidene fluoride (VDF) into the reactor. After the reactor pressure was stabilized, 5.2 lbs of an aqueous initiator solution containing 1 wt % potassium persulfate and 1 wt % sodium acetate was added to the reactor to jumpstart polymerization. The rate of further addition of initiator solution was so adjusted to obtain and maintain a VDF polymerization rate of roughly 70 pounds per hour. The VDF homopolymerization was continued until 100 lbs of VDF was fed to reactor, at this point a 1 wt % aqueous solution of sodium lauryl sulfate (SLS) was introduced into the reactor at ratio to monomer of 1.5%. After adding total of 150 lbs of monomer to the reactor, and 18.3 lbs of initiator solution, all feeds were stopped. After 20 minutes, the agitation was stopped and the reactor was vented and the latex recovered. Latex had 27% solids with particle size of 155 nm. To the final latex, solution of SLS at ratio to solids of 0.5% was added. Polymer resin was isolated by coagulating the latex, washing the latex with deionized water, and drying. The resin had a melt viscosity of 24 kilopoise measured at 232° C., a DSC melt point of 163-168° C.

Ethylene carbonate (EC) was added to the resultant latex and (designated SPS-2) where the ratio of EC to latex was 27/100 wt/wt.

Cell Cycle Life at 60° C. Temperature

Two sets of 18650 cells with nominal capacity of 2.0 Ah using LiCoO$_2$ cathodes, one made with SPS-2 and the other one with SPS-2 plus NMP, and they were cycled at 60° C. The results at 60° C. are significant as the decay rate is generally faster at elevated temperatures as compared to room temperature. The discharge capacity vs. the cycle number at 60 C was established for a pair of cells made with 1.5% SPS-2 binder, and another pair made with 1.5% WF plus 5 wt % NMP. After 100 cycles, the cells lost about 7% of its initial capacity, indicating SPS-2 is surprisingly is a very good water based binder for lithium ion cathode. The all cells were discharged to 2.8V at 1 A and charged to 4.2V at 1.5 A.

What is claimed is:

1. An electrode comprising an electroconductive substrate coated on at least one surface with an aqueous composition comprising:
    a) from 0.5 to 150 parts of fluoropolymer particles having a weight average particle size of less than 500 nm, wherein said fluoropolymer is a polyvinylidene fluoride (PVDF) homopolymer or copolymer comprising at least 70 mole percent of vinylidene fluoride units;
    b) from 10 to 500 parts of one or more powdery electrode-forming materials;
    c) from 1 to 150 parts of one or more organic carbonates;
    d) 100 parts of water;
all parts are by weight and based on 100 parts by weight of water.

2. The electrode of claim 1, wherein said aqueous composition comprises:
    a) from 1 to 100 parts of fluoropolymer particles having a weight average particle size of less than 400 nm;
    b) from 20 to 400 parts of one or more powdery electrode-forming materials;
    c) from 2 to 100 parts of one or more organic carbonates;
    d) 100 parts of water;
all parts are by weight and based on 100 parts by weight of water.

3. The electrode of claim 2, wherein said aqueous composition comprises:
    a) from 5 to 75 parts of fluoropolymer particles having a weight average particle size of less than 400 nm;
    b) from 25 to 300 parts of one or more powdery electrode-forming materials;
    c) from 10 to 75 parts of one or more organic carbonates;
    d) 100 parts of water;
all parts are by weight and based on 100 parts by weight of water.

4. The electrode of claim 1, wherein said organic carbonate is selected from the group consisting of carbonates having the general formula: $(R_2)CO_3(R_1)$ where $R_1$ and $R_2$ represent a linear or branched $C_{1-4}$ alkyl group; $R_1$ and $R_2$ can be the same of different; ethylene carbonate; propylene carbonate; butylene carbonate isomers; and vinylene carbonate, and mixtures thereof.

5. The electrode of claim 4, wherein said organic carbonate is ethylene carbonate, propylene carbonate, or a mixture thereof.

6. The electrode of claim 1, wherein said aqueous composition further comprises an effective amount of one or more additives selected from the group consisting of surfactants, anti-settling agents, wetting agents, thickeners, rheology modifiers, fillers, leveling agents, anti-foaming agents, and pH buffers.

7. The electrode of claim 1, wherein said aqueous composition consists of said fluoropolymer; water; and organic carbonate, wherein said organic carbonate is ethylene carbonate, propylene carbonate, or a mixture thereof.

8. The electrode of claim 1, wherein said PVDF has a melt viscosity of greater than 1.0 kp, by ASTM D-3835 at 450° F. and $100^{-1}$ sec.

9. The electrode of claim 1, wherein said powdery electrode material comprises one or more materials selected from the group consisting of lithium-salts of metal oxides, sulfides and hydroxides; LiCoO$_2$, LiNi$_x$Co$_{1-x}$O$_2$, LiMn$_2$O$_2$, LiNiO$_2$, LiFePO4, LiNi$_x$Co$_y$Mn$_z$O$_m$, LiNi$_x$Mn$_y$Al$_z$O$_m$ where x+y+z=1 and m is an integer representing the number of oxygen atom in the oxide to provide an electron-balanced molecule; lithium cobalt oxide, lithium iron phosphate, lithium manganese phosphate, lithium-nickel oxide, and lithium-manganese oxide, carbonaceous materials, nano-titanates, graphite, activated carbon, carbon black, phenolic resin, pitch, tar, and carbon fibers.

10. The electrode of claim 1, wherein said electroconductive substrate coated on at least one surface with a dried composition comprising:
    a) from 0.5 to 150 parts of fluoropolymer particles, in the form of individual particles, having a weight average particle size of less than 500 nm, wherein said fluoropolymer is a polyvinylidene fluoride (PVDF) homopolymer or copolymer comprising at least 70 mole percent of vinylidene fluoride units;

b) from 10 to 500 parts of one or more powdery electrode-forming materials;

c) from 1 to 150 parts of one or more organic carbonates, wherein said electrode exhibits interconnectivity.

11. A device comprising at least one electrode of claim 10, wherein said device is selected from the group consisting of an non-aqueous-type battery, a capacitor, and a membrane electrode assembly.

* * * * *